Dec. 18, 1928.
S. GREEN
1,695,652
DRYING APPARATUS
Filed Jan. 13, 1928 2 Sheets-Sheet 1
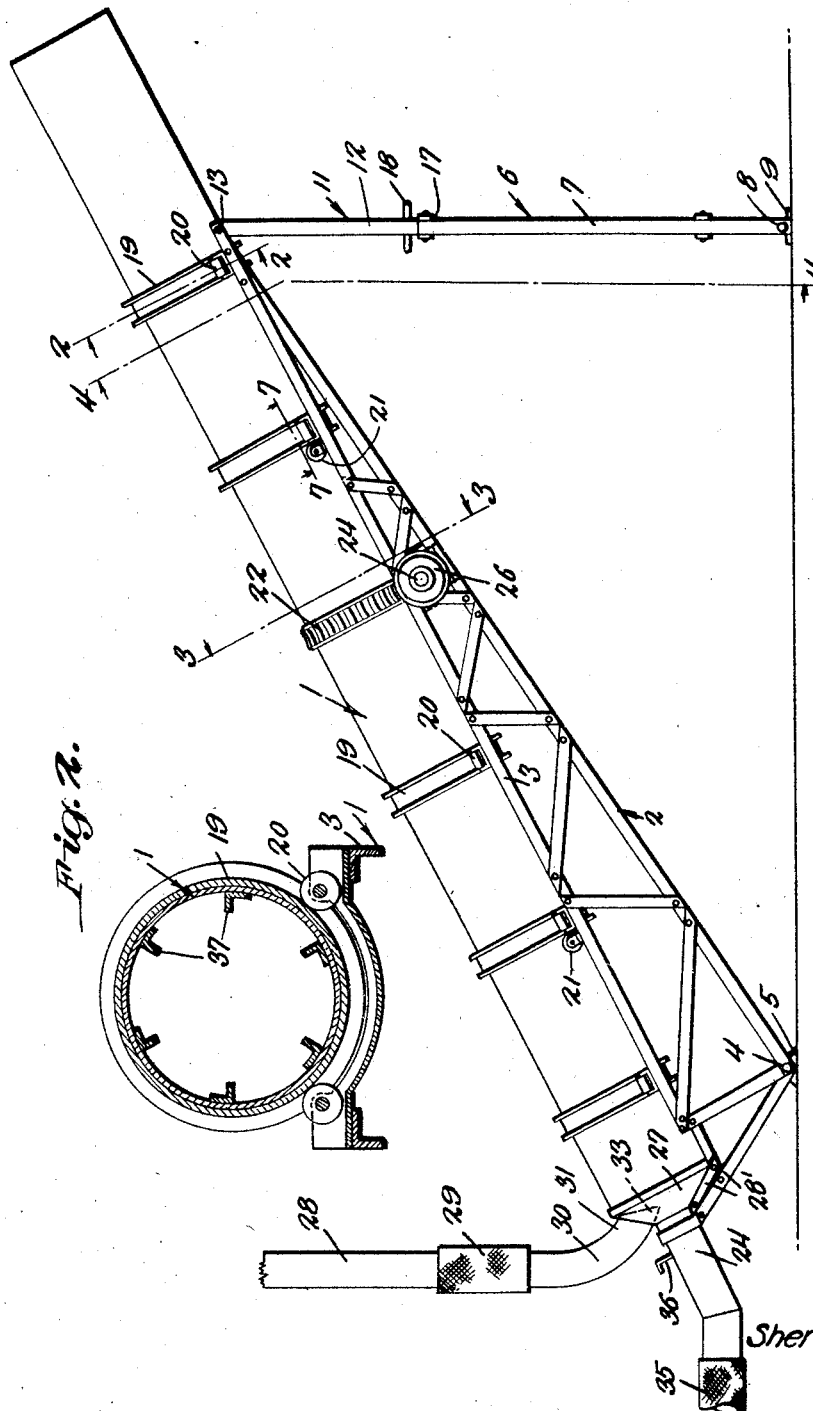

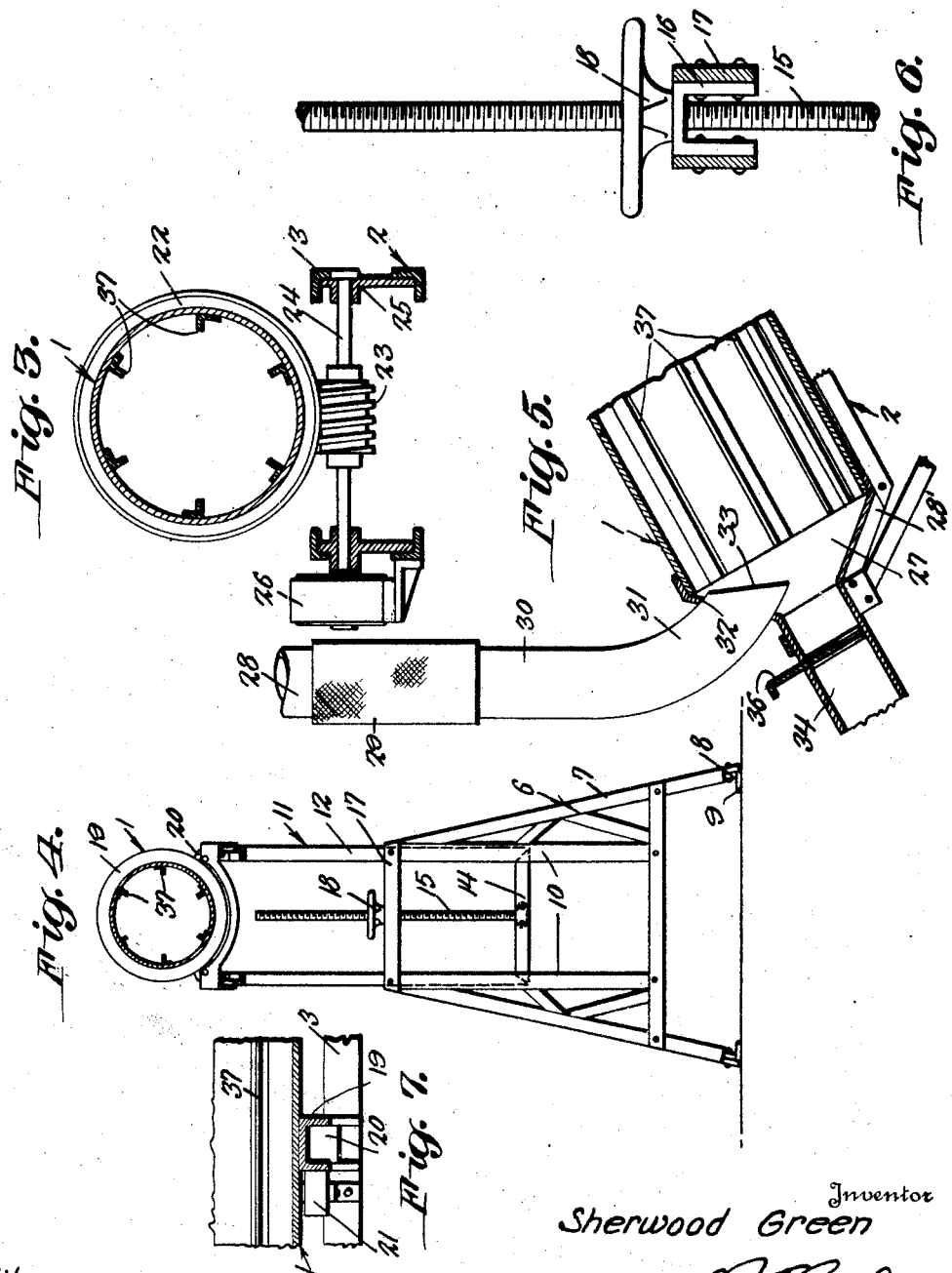

Patented Dec. 18, 1928.

1,695,652

UNITED STATES PATENT OFFICE.

SHERWOOD GREEN, OF BERKELEY, CALIFORNIA.

DRYING APPARATUS.

Application filed January 13, 1928. Serial No. 246,568.

This invention relates to apparatus for drying cotton and other material possessing similar physical characteristics.

In ginning cotton, it frequently happens that the cotton, in its natural state, contains too much moisture to enable it to be acted upon in the gin and heretofore considerable difficulty has been experienced in drying such cotton as to render it susceptible to the ginning operation, and therefore the present invention has as one of its objects to provide an apparatus by the use of which moist or wet cotton may be thoroughly dried and rendered suitable for ginning, the invention contemplating, in this connection, an apparatus which will operate continuously and automatically to substantially uniformly dry cotton fed thereto, regardless of the different percentages of moisture contained in different portions of the batch or batches of cotton delivered to the apparatus, so that the invention has as a further object to provide a cotton drying apparatus which will deliver, after treatment, cotton of a uniform character, the apparatus being so constructed as to provide for a prolonged subjection of the portion of the cotton which has the greatest moisture percentages, and a subjection of the dryer cotton to the drying operation for a shorter period of time.

Another object of the invention is to provide an apparatus of the class described capable of adjustment of certain component parts to adapt the apparatus to act with maximum efficiency upon cotton in accordance with the physical state of the cotton, so that the apparatus may, at all times, operate with a maximum efficiency.

Another object of the invention is to provide a drying apparatus of the class described which may be operated with a minimum expenditure of power and the operation readily controlled.

Another object of the invention is to provide a drying apparatus which, while designed primarily for use in drying cotton prior to ginning, may be equally as well employed in drying other material of a similar character.

While the accompanying drawings and the description which is to follow, constitute a disclosure of the preferred embodiment of the invention, it will be understood that various changes may be made within the scope of what is claimed.

In the accompanying drawings:

Figure 1 is a view in side elevation of the drying apparatus embodying the invention;

Figure 2 is a detail vertical transverse sectional view taken substantially on the line 2—2 of Figure 1 looking in the direction indicated by the arrows;

Figure 3 is a similar view on the line 3—3 of Figure 1 looking in the direction indicated by the arrows;

Figure 4 is a similar view on the line 4—4 of Figure 1 looking in the direction indicated by the arrows;

Figure 5 is a detail vertical longitudinal sectional view through the lower portion of the apparatus;

Figure 6 is a view partly in elevation and partly in section illustrating an adjusting means constituting a part of the apparatus;

Figure 7 is a detail sectional view on the line 7—7 of Figure 1 looking in the direction indicated by the arrows.

Generally speaking the apparatus, embodying the invention, comprises an inclined cylindrical, rotary drying chamber into the lower end of which the cotton, to be dried, is delivered, means for supplying a blast of heated air to the chamber at the lower end thereof to cause travel of the cotton upwardly through the chamber, and means within the chamber for agitating the cotton during its period or travel through the chamber, and in the drawings the chamber is indicated in general by the numeral 1 and the same is rotatably supported, by a means which will now be described, upon a supporting frame structure which is indicated in general by the numeral 2 and which may be of the truss formation shown in the drawings or of any other character, this structure embodying however a pair of spaced parallel members indicated by the numeral 3 which extend substantially throughout the entire length of the frame. The frame is mounted at its lower end, preferably by means of a shaft or other pivotal support 4, upon a base 5 which will be fixed to the floor of the room in which the apparatus is installed, and a means which will now be described is provided at the other end of the frame for supporting this end of the frame and for adjusting the same so as to vary the angle of inclination of the frame.

The supporting means referred to above comprises a frame structure 6 which includes upwardly inclined spaced uprights 7 mounted at their lower ends as at 8 upon brackets 9, so as to be capable of a limited tilting movement, the brackets 9 being, as in the case of the base 5, securely anchored to the floor of the room in which the apparatus is installed. In addition to the uprights 7, the frame structure 6 further includes a pair of spaced parallel uprights 10 which are secured and braced in any suitable manner in the frame structure and between the uprights 7, and these uprights 10 are preferably of channel formation and have their open sides presented toward each other so as to slidably accommodate the side members 11 of a rectangular supporting frame 12 which is pivotally connected at its upper end as at 13 to the upper ends of the side members 3 of the frame structure 2, the members 12 being connected at their lower ends by a cross piece 14 in the intermediate portion of which is fixed the lower end of a threaded shaft 15 which shaft extends upwardly through a bearing member 16 which is secured between spaced cross bars 17 secured at their ends to and extending between the upper ends of the uprights 10 of the frame structure 6, a hand wheel 18, which has a threaded hub, being fitted onto the said threaded shaft 15, it being understood at this point that by rotating the hand wheel 18, the shaft 15 may be vertically adjusted through the bearing member 16 to correspondingly adjust the frame structure 6 and therefore elevate or lower the respective or upper end of the frame structure 2, this serving, as will presently be made apparent, to correspondingly angularly adjust the chamber 1 and thus provide for adjustment of said chamber to the desired angle of inclination.

In order that the chamber 1 may be rotatably supported upon the frame structure 2, annular rails of channel formation, indicated by the numeral 19, are disposed to circumscribe the chamber at various points in the length thereof and pairs of rollers 20 are mounted upon the side members 3 of the frame structure 2 at correspondingly spaced points and engage in the channels of the said rails. In order that the rollers 20 may be relieved of endwise thrust which would otherwise be imposed upon them by the side walls of the channels of the rails 19, due to the inclination of the heating chamber 1, rollers 21 are arranged in pairs upon the side members 3 of the frame structure 2, the rollers of each pair being positioned so as to be engaged by the outer side of that flange of a respective one of the rails 19 which is located next adjacent the lower end of the heating drum, as clearly shown in Figures 1 and 7 of the drawings, the rollers 21 being so positioned that the flanges of all of the rails 19 will travel past the ends of the respective rollers 20 without frictionally contacting the same in a manner to impede the rotation of the heating drum to impose any thrust upon said rollers.

Rotary motion may be imparted to the heating chamber 1, by any means found desirable, and, as illustrated in the drawings and particularly in Figures 1 and 3 thereof, an annular worm gear 22 is disposed to surround the chamber 1 intermediate the ends thereof and meshes with a worm 23 fixed upon a shaft 24 rotatably journaled in suitable bearings 25 mounted upon the side members 3 of the frame structure 2, this gear 22 being preferably positioned intermediate two of the circumscribing rails 19 as shown in Figure 1 and having a power transmitting element such for example as a pulley 26, fixed upon one of its ends, so that rotary motion transmitted to the shaft 24 will in turn be transmitted to the chamber 1, through the worm 23 and worm gear 22. It will be understood at this point that power may be applied, in any suitable manner, to the shaft 24, as for example by mounting an electric motor directly upon the frame structure 2, or providing a pulley as illustrated in the drawings, or in any other manner found most convenient and permitting of course of vertical tilting adjustment of the frame structure to provide for the desired angular adjustment of the chamber 1 to assume various inclined positions, and with regard to the adjusting means heretofore described and illustrated in Figure 4, in detail, it will be evident that any other means found convenient may be employed for elevating and lowering the delivery or upper end of the heating chamber 1, the illustration of the drawings being merely representative of one means which may be employed for this purpose.

At its lower end the chamber 1 rotates within a preferably conical head 27 which is rigidly supported by suitable bracing frame members 28', at the lower end of the frame structure 2 and is therefore stationary, and in order that the cotton to be dried may be delivered to the heating chamber 1, a pipe 28, of a suitable size to permit of free passage of the cotton therethrough, is led from any convenient point where the cotton may be fed, and this pipe is connected by a realtively short length of flexible hose or by any other suitable flexible joint, 29, to the upper end of a spout 30 which has a curved lower end portion 31 fitted through and secured within an opening 32 provided in the upper side of the head 27, the delivery end of the spout, which is indicated by the numeral 33, being preferably disposed at such an angle that it will be presented substantially directly toward the lower end of the said chamber 1.

As previously explained, the invention contemplates subjecting the cotton to be dried, to the action of heated air, and for this purpose the head 27 is provided with a tubular extension 34 adapted to be connected by a length of flexible hose 35, with a pipe through which heated air under pressure is to be delivered from a suitable source of supply, and in order that the supply of air to the chamber 1, by way of the spout 34, may be regulated, a cut-off plate 36 is preferably mounted in the spout near its juncture with the head 27 and may be adjusted, as will be evident by reference to Figure 5, so as to regulate the flow of air through the spout. At this point it will be observed that the delivery end 33 of the spout 30 is located in the path of the blast of heated air delivered by way of the spout 30 and head 27, to the chamber 1, so that an upwardly flowing current of air is created throughout the length of the chamber 1. In the operation of the apparatus, this blast is regulated so that it will have sufficient force to carry with it, upwardly through the chamber 1, the cotton which is delivered from the spout 30, and in order that the cotton delivered into the lower end of the heating chamber may be thoroughly agitated in its passage through the said chamber, baffles 37 are arranged upon the inner side of the wall of the chamber and extend longitudinally thereof throughout the entire length of the chamber and these baffles project radially inwardly as clearly shown in Figures 2, 3 and 4 of the drawings.

From the foregoing description of the invention it will be evident that, the greater the inclination of the heating chamber 1, the greater will be the tendency for the cotton to settle by gravity in the chamber, and in practice the angle of inclination of the chamber will be varied and the cut-off plate 36 will be adjusted so as to regulate the blast of heated air delivered into the lower end of the chamber, both in consonance with the moisture content of the cotton to be treated. It will also be understood at this point that the baffles 37 will pick up cotton which tends to fall to the lower side of the drying chamber and carry the same upwardly, the cotton falling by gravity as it reaches the most elevated point to which it can be carried by the baffles, and then dropping by gravity, across the blast of heated air passing through the chamber, to the lower side of the chamber. In this manner a very thorough circulation of the air and action of the air on the cotton is insured and in this manner the drying of the cotton is greatly expedited. Where the cotton is in such condition that it carries a considerable percentage of moisture, it will be found desirable to so angularly adjust the heating and drying chamber and the blast of heated air delivered thereto, as to provide for a somewhat retarded passage of the cotton through the chamber and, where the cotton is in a condition containing but little moisture, the drying chamber may be brought more nearly to the horizontal position and the blast of air may be regulated so as to provide for a more rapid passage of the cotton through the chamber. In any event, however, the moisture present in the cotton will not be evenly distributed, and therefore the particles of cotton which are nearly devoid of moisture or, in other words, are practically dry, will be carried through the chamber more rapidly than the particles which contain considerable moisture and which are therefore heavier. It will also be evident from the foregoing description that, as the cotton is elevated and then dropped, by the baffles, within the drying chamber, it will be disintegrated by the blast of air as well as being acted upon by the blast to drive off the moisture by evaporation, and consequently, when the cotton has been sufficiently disintegrated and has been deprived of its moisture, it will readily pass from the upper or delivery end of the drying chamber under the influence of the blast of heated air delivered into the chamber, and may fall by gravity into suitable receptacles arranged beneath the said end of the chamber, or the dried cotton may be permitted to fall onto a conveyor arranged to travel beneath the said end of the chamber, or, if desired, this end of the chamber may be positioned in proximity to the cotton gin and the cotton delivered from the chamber to the gin by the creation of a suction force.

While the arrangement of the cut-off plate 36 and the delivery end of the spout 30, as illustrated in the drawings and as heretofore described, is desirable, it will be evident that these parts may be otherwise arranged and located, if found desirable.

While the apparatus herein illustrated and described is designed primarily for use in drying cotton, it will be evident that it may be employed in drying other material of a similar nature and sufficiently light to be adapted to be conveyed through the drying chamber by the blast of air delivered to said chamber.

Having thus described the invention, what I claim is:

1. In drying apparatus, a rotary inclined drying chamber, means for delivering the material to be dried to the lower portion of the chamber, and means for delivering a blast of air into the chamber in a direction to provide for a current of air flowing longitudinally within the chamber toward the upper end thereof.

2. In drying apparatus, a rotary inclined drying chamber, means for adjusting the angle of inclination of said chamber, means for delivering the material to be dried to the lower portion of the chamber, and means for delivering a blast of air into the chamber in a direction to provide for a current of air flowing longitudinally within the chamber toward the upper end thereof.

3. In drying apparatus, a rotary inclined drying chamber, means for delivering the material to be dried to the lower portion of the chamber, and means for delivering a blast of air into the chamber at a point below and in advance of the point of delivery of the material into the chamber whereby to establish a current of air flowing longitudinally within the chamber in the direction of the upper end thereof and conduct the material to be dried through the chamber during the drying operation.

4. In drying apparatus, a rotary inclined drying chamber, baffles upon the inner side of said chamber for agitating material delivered into the chamber to be dried, means for delivering the material to be dried to the lower portion of the chamber, and means for delivering a blast of air into the chamber at the lower portion thereof and in a direction to provide for a current of air flowing longitudinally within the chamber toward the upper end thereof.

5. In drying apparatus, a rotary inclined drying chamber, a head in which the lower end of the chamber is rotatably received, a spout leading into the chamber through said head for delivering material into the lower portion of the chamber, the said head having a spout extension, and a compressed air delivery pipe connected with said extension to deliver a blast of compressed air into the chamber in a direction to travel longitudinally therein in the direction of the upper end of said chamber.

6. In drying apparatus, a rotary inclined drying chamber, a head in which the lower end of the chamber is rotatably received, a spout leading into the chamber through said head for delivering material into the lower portion of the chamber, the said head having a spout extension, a compressed air delivery pipe connected with said extension to deliver a blast of compressed air into the chamber in a direction to travel longtudinally therein in the direction of the upper end of said chamber, and baffles upon the inner surface of the wall of the chamber constituting means for agitating the material being carried through said chamber by the blast of air.

7. In drying apparatus, a frame structure supported for tilting movement, means operable to adjust the frame structure, a rotary inclined drying chamber supported upon the frame structure, means for rotating said chamber, means for delivering the material to be dried to the lower portion of the chamber, and means for delivering a blast of air into the lower portion of the chamber in a direction to provide for a current of air flowing longitudinally within the chamber toward the upper end thereof.

8. In drying apparatus, a rotary inclined drying chamber, an inclined frame supporting said chamber, a shaft rotatably mounted in said frame, a worm upon the shaft, an annular worm gear encompassing the chamber and meshing with said worm, means for delivering the material to be dried to the lower portion of the chamber, and means for delivering a blast of air into the lower portion of the chamber in a direction to provide for a current of air flowing longitudinally within the chamber toward the upper end thereof.

9. In drying apparatus, a cylindrical, rotary, inclined drying chamber, an inclined frame for supporting said chamber, rollers upon the frame at opposite sides thereof, annular rails surrounding the said chamber and riding upon the rolls, means for imparting rotary motion to the chamber, a head at the lower end of the chamber, a spout extending into said head for delivering the material to be dried into the lower portion of the chamber, and means for delivering a blast of air through the head and into the chamber in a direction to provide for a current of air flowing longitudinally within the chamber toward the upper end thereof.

10. In drying apparatus, a rotary inclined drying chamber, means for delivering the material to be dried to the lower portion of the chamber, means for delivering a blast of air into the chamber in a direction to provide for a current of air flowing longitudinally within the chamber toward the upper end thereof, and means for controlling the supply of air.

11. In drying apparatus, a rotary inclined drying chamber, means for delivering the material to be dried to the lower portion of the chamber, means for delivering a blast of air into the chamber in a direction to provide for a current of air flowing longitudinally within the chamber toward the upper end thereof, means for controlling the supply of air, and means for varying the angle of inclination of the chamber.

12. In drying apparatus, a rotary inclined drying chamber, means for delivering the material to be dried to the lower portion of the chamber, means for delivering a blast of air into the chamber in a direction to provide for a current of air flowing longitudinally within the chamber toward the upper end thereof, and means for varying the inclination of the chamber.

In testimony whereof I affix my signature.

SHERWOOD GREEN.